Figure 1:
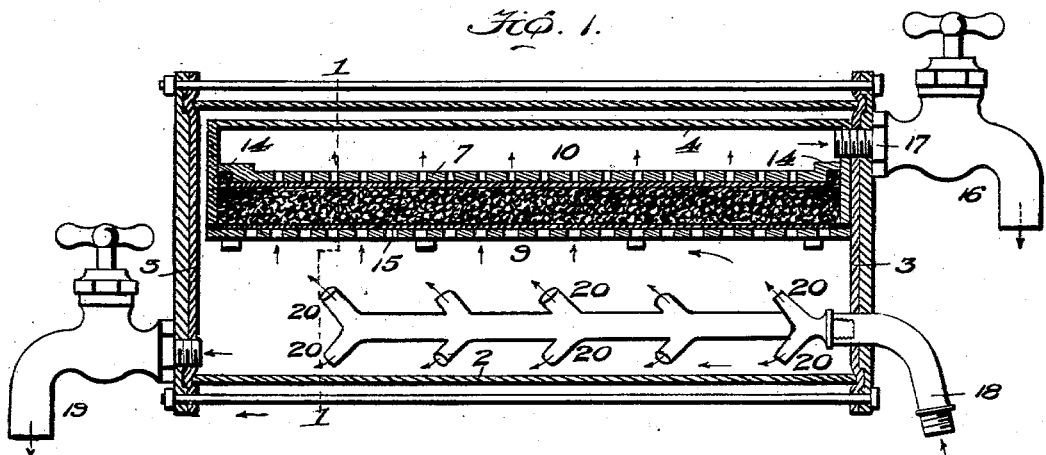

No. 739,809. PATENTED SEPT. 29, 1903.
C. A. BAKER.
FILTER.
APPLICATION FILED DEC. 23, 1902.
NO MODEL.

Witnesses
Thomas Hood Yeager.

Inventor
Charles A. Baker
By Johnson & Johnson
Attys.

THE NORRIS PETERS CO., PHOTO-LITHO., WASHINGTON, D. C.

No. 739,809. Patented September 29, 1903.

UNITED STATES PATENT OFFICE.

CHARLES A. BAKER, OF NEWARK, NEW JERSEY.

FILTER.

SPECIFICATION forming part of Letters Patent No. 739,809, dated September 29, 1903.

Application filed December 23, 1902. Serial No. 136,330. (No model.)

*To all whom it may concern:*

Be it known that I, CHARLES A. BAKER, a citizen of the United States, residing at Newark, in the county of Essex and State of New Jersey, have invented certain new and useful Improvements in Filters, of which the following is a specification.

My invention is directed to improvements in water-filters of the granular-bed type and in which the filtration is effected by the pressure of the water-flow, and my said improvements comprise novel features, which will be hereinafter described, and particularly pointed out in the claims appended hereto.

Distinguishing features of my invention reside in an imperforate-shell device, which of itself constitutes a closure or housing for the filtering medium and a chamber for accumulating, retaining, and supplying the filtered water situated within the water-receiving and sediment chamber, and in provision for cleaning the filter-bed surface and the floor of the sediment-chamber.

In the accompanying drawings I have shown a filter device embodying my invention in the form at present preferred by me, and the following description of the device shown in the drawings will enable any person skilled in the art to construct and use the same; but it will be understood that various modifications and changes may be made without departing from the spirit of my invention and without exceeding the scope of the claims.

Figure 2:
Figure 8:
Figure 6:
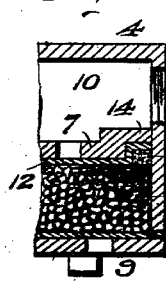
Figure 3:
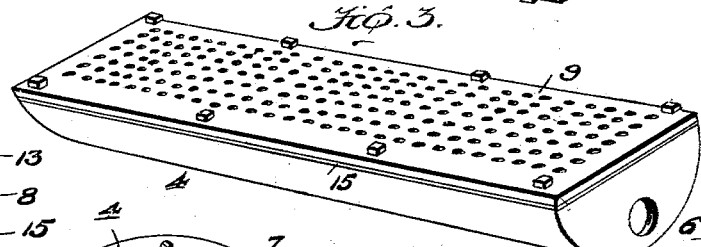
Figure 7:
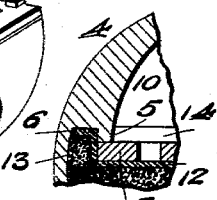
Figure 4:
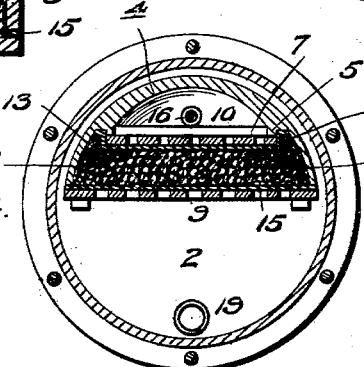
Figure 5:
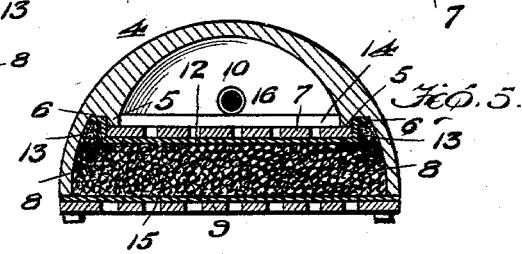

Referring to the drawings, Figure 1 represents in longitudinal section a water-filter embodying the parts and combinations of parts which constitute my invention. Fig. 2 is a view in perspective of the device which is arranged within the water-receiving chamber and contains the filtering medium and forms the accumulating-chamber for the filtered water, and Fig. 3 is an inverted view of the same. Fig. 4 is a transverse section on the line 1 of Fig. 1, showing the relation of the device which contains the filtering medium and forms the accumulating-chamber for filtered water to the water-receiving and sediment chamber. Fig. 5 shows in transverse section the imperforate-shell device which contains the filtering medium and forms the chamber into which the filtered water accumlates and from which it is supplied. Figs. 6, 7, and 8 are enlarged views to show more clearly certain details of construction for sealing the filtering device proper with the walls of the water-receiving and sediment chamber.

A cylinder fixed horizontally forms the water-receiving and sediment-collecting chamber 2, and one or both of the cylinder-heads may be secured by nutted rods, with head-packing leather disks 3, and the cylinder may, if desired, be made of glass and of a proportion about four times its length to one in width. The filtering device proper also forms the chamber for the filtered water and is fixed in the upper portion of the chamber of this cylinder and consists of a hollow casting or shell 4, imperforate and open at one side. Its inner walls at points opposite and about midway its depth are formed with offsets or shoulders 5, forming grooves 6 between the shoulders and the wall, Figs. 5 and 7. A perforated metal plate 7 is seated on these shoulders and divides the interior of the shell, the outer or open side of which is filled with a suitable filtering medium 8, packed to the proper density and held in place between the walls of the shell by a perforated metal plate 9, secured to the edges of the shell, as in Figs. 3 and 5. The inner division of this imperforate shell forms the chamber 10 for the filtered water and from which it is supplied.

To isolate the filtering medium from contact with the water to be filtered and from the filtered water and to increase the effectiveness of the filtering medium, a sheet of asbestos 12 is laid upon the inner perforated plate next to the filtering medium and its edges are packed into the grooves 6 in the side walls of the shell and fastened and seated therein by suitable cement 13, thereby sealing the side edge joints of the perforated plate with the side walls of the shell, as in Figs. 4, 5, and 7.

I prefer to form the seating-shoulders 5 for the perforated plate 7 only along the side walls of the shell, as seen in Figs. 5 and 8, and to form a transverse sink or recess by the lips 14 at each end of the said plate, as in Figs. 1 and 6, so that at its ends the perforated plate will join the end walls of the shell, while at its side edges the plate is seated on the wall-shoulders of the shell and does not extend over the grooves, as in Fig. 5. Into the grooves 6 thus formed by the shoulders 5 in the opposite sides of the shell are forced the edges of the asbestos sheet 12 over and against the edges of the perforated plate by tamping the cement into the grooves on the sheet, which is thereby caused to seal the perforated plate along its edges, so that no water can pass at the side joints of the plate. At the ends of the plate the seal is continued by tamping the cement and the end edges of the sheet into the sinks formed by the end lips 14, as in Fig. 6. The sinks for this purpose are on the under side of the plate, the ends of which abut against the inner walls of the shell, and thus make water-tight joints at the ends of the plate. The cement in the side grooves and in the end sinks is thus made continuous around the edges of the perforated plate, because both the shell-grooves and the plate-sinks open downward, as in Figs. 5 and 6. This facing of sheet-asbestos, therefore, while forming a porous-wall filtering medium supplementing the perforated plate, serves also to maintain the seating of the plate upon the wall-shoulders 5 and the means of sealing the joints of the plate.

The lower or outer perforated plate 9 forms the cover for the open side of the shell and holds the filtering material in place, and on the inner face of this outer plate is laid a sheet of asbestos 15, which is bound to edges of the shell by the bolts which fasten said cover-plate and forms a wall-filter for the latter.

It is important to note that the granular bed is housed between sheets of asbestos forming wall-filters, the lower one of which prevents the impurities of the water from contact with the granular bed, while separating the impurities from the water which filters through the asbestos and through the granular bed, while that sheet of asbestos which forms the inner facing to the upper perforated plate serves the important purpose of a wall-filter for preventing particles of the filtering material from being forced from the bed up through the perforations in the plate which forms the floor of the shell-chamber 10, into which the filtered water accumulates and from which it is supplied. Looking at Fig. 1, it will be seen that this shell device is fastened by screwing into its solid end the faucet 16, through which the water is drawn from the shell, thereby binding the end of the filter-shell hard against the leather packing-disks 3 of the cylinder-head, thereby practically suspending the filter device proper from the cylinder-head. For this purpose the draft-faucet pierces the head and screws into the end of the filter-shell, and a shoulder 17 on the faucet-stem jamming against the outer side of the cylinder-head causes the faucet when driven home to draw the end of the filter-shell casting against the leather packing, so that the other end of the shell-casting does not necessarily require a support except in large filters.

The water-supply pipe 18 pierces the head of the cylinder into the cylinder-chamber beneath the filter, and a washout or faucet 19 pierces the other cylinder-head at the floor-wall. This chamber therefore receives the inflow and forms the washout simply by opening the wash-outlet or faucet, and this without interrupting the filtering operation. It is also important to note that in the construction shown the filtering device is surrounded by the water to be filtered, so that while the pressure of the inflow is up through the bottom of the filter the pressure upon the filter is thereby caused to be measurably equalized upon and around the imperforate shell, and for this purpose I provide for fastening the shell-filter by its end only to one of the cylinder-heads; but this construction is not material, and this device may be otherwise supported within the water-receiving chamber so long as its filtered water-chamber 10 is connected to the draft-faucet, nor do I wish to be confined to the means shown for supporting and sealing the upper or inner perforated plate and its asbestos-fabric facing upon the walls of the shell-filter so long as the asbestos fabric and cement are employed to make the seal.

The most important requirement in a water-filter is to keep the filtering material from being contaminated with the impurities in the water and to keep the water-receiving chamber and its walls clean and free from sediment. For this purpose I have provided the water-inlet with a plurality of nozzles 20, extended within said chamber and arranged to project, under the pressure of the supply, jets of water against the perforated surface of the filter-bed and upon the bottom of the said chamber, as illustrated in Fig. 1. The nozzles for this purpose are preferably arranged in their relation to the inlet-pipe to project the water obliquely against the walls, and thereby have a better washing and cleaning effect and the driving of the impurities and the sediment toward the washout-faucet. By this provision for distinct washing-jets the perforated surface of the filter-bed can be so thoroughly washed as to keep the perforations of the bed-covering plate from being choked with the impurities in the water, thereby keeping the covering-surface of the filter-bed clean.

Obviously the washout-faucet may be used for house cleaning or washing purposes without interfering with the filtering operation. In charging the shell with the filtering substance the shell is placed with its open side up, the perforated plate 7 seated on the shoulders 5, the asbestos cloth spread over upon the plate covering its perforations, and the edges of the cloth tamped into the groove around the plate and sealed with cement, which when hardened fastens the plate on its seat. The filtering material is then packed in the chamber upon the asbestos sheet and upon its cement packing, filling the chamber even with the shell-walls. Over this packed filtering material the sheet of asbestos 15 is placed and upon it is laid and fastened the perforated cover-plate 9, thereby completing the shell device with a filter-bed composed of a granular bed incased between porous walls and having in itself a chamber which receives and supplies the filtered water.

I prefer to make the shell-filter of semi-cylindrical form, because it gives convenient use in the upper part of a cylindrical water-receiving chamber, and I prefer to make this shell device long and narrow, the better thereby to give stiffness to the perforated cover of the filter-bed and prevent it from bulging and consequent impairment of the effectivenes of the sealing-joints of the filter-bed-housing parts. The filter-shell can be removed from its fastening-faucet and the filter-bed renewed when desired.

I claim—

1. A filter device consisting of a cast shell open at one side its inner opposite walls formed with integral offsets, a perforated plate lapping on said offsets and forming a chamber for the filtered water, a plastic sealing the joints of the plate upon the wall offsets, a filter-bed upon the plate and covering its joint-sealing plastic, and a perforated plate closing the open side of the shell.

2. In a filter and in combination, a cylinder having an inlet, a shell containing a filter-bed and providing a chamber for the filtered water, a screw-faucet piercing the cylinder-head and engaging a screw-threaded opening in the end of the shell, and a packing between the head and the clamped end of the shell.

3. A filter device consisting of an imperforate shell or casting open at one side, a filter-bed and a housing therefor consisting of a perforated plate seated within and dividing the chamber of the shell, a perforated cover-plate closing the open side of the shell and an asbestos cloth or wall covering for each perforated plate, forming a chamber within which the filtered water accumulates and from which it is drawn.

4. A filter device consisting of an imperforate shell or casting open at one side and having its inner opposite walls formed each with a shoulder and a groove, a filter-bed, a perforated plate for said bed seated upon said shoulders and dividing the chamber of the shell, an asbestos cloth or wall covering the plate and the bed and sealed within the shell-grooves and over the ends of said plate, a perforated cover-plate and bed, forming a chamber within the shell for the filtered water.

5. In a filter and in combination with a cylinder having an inlet and a wash-outlet, an imperforate shell or casting open at one side, a filter-bed closing its open side and forming a chamber within the shell into which the filtered water accumulates, from the cylinder, and a draft-faucet piercing the cylinder-head and screwed into the end wall of the shell whereby the filtered water is drawn from the shell-chamber and the shell secured to the cylinder-head.

6. A filter having in combination, a cylinder having a wash-outlet, a filter-bed having a perforated bottom within the cylinder, and a water-inlet having a plurality of nozzles arranged to project jets of water in upward oblique directions against the perforated surface of the filter toward the wash-outlet.

7. A filter having in combination, a cylinder having a wash-outlet, a filter-bed having a perforated bottom within the cylinder and a water-inlet having a plurality of nozzles arranged to project jets of water in upward oblique directions against the perforated surface of the filter and obliquely downward upon the bottom of the cylinder toward the wash-outlet.

In testimony whereof I affix my signature in presence of two witnesses.

CHARLES A. BAKER.

Witnesses:
A. E. H. JOHNSON,
T. HOOD YEAGER.